US008269365B2

(12) United States Patent
Clement et al.

(10) Patent No.: US 8,269,365 B2
(45) Date of Patent: Sep. 18, 2012

(54) APPARATUS FOR CONVERTING WAVE ENERGY INTO ELECTRIC POWER

(75) Inventors: Alain Clement, Nantes (FR); Aurélien Babarit, Nantes (FR); Gaëlle Duclos, Orvault (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 0 days.

(21) Appl. No.: 13/174,460

(22) Filed: Jun. 30, 2011

(65) Prior Publication Data

US 2012/0001432 A1 Jan. 5, 2012

Related U.S. Application Data

(63) Continuation of application No. 11/665,444, filed as application No. PCT/EP2005/055234 on Oct. 13, 2005, now Pat. No. 7,989,975.

(30) Foreign Application Priority Data

Oct. 15, 2004 (FR) ..................................... 04 10927

(51) Int. Cl.
*F03B 13/10* (2006.01)
*F03B 13/12* (2006.01)
*H02P 9/04* (2006.01)
*F02B 63/04* (2006.01)
*F03G 7/08* (2006.01)
*H02K 7/18* (2006.01)
(52) U.S. Cl. .............................. 290/53; 290/1 R; 290/42
(58) Field of Classification Search ................... 290/1 R, 290/42, 53
See application file for complete search history.

(56) References Cited

U.S. PATENT DOCUMENTS

| 3,204,110 A | 8/1965 | Masuda | 290/42 |
| 3,231,749 A | 1/1966 | Hinck, III | 290/53 |
| 3,696,251 A | 10/1972 | Last et al. | 290/53 |

(Continued)

FOREIGN PATENT DOCUMENTS

FR   547765   7/1924
(Continued)

OTHER PUBLICATIONS

Babarit, A.; Dulcos, G.; Clement, A.H.; "*Benefit of Latching Control for a Heaving Wave Energy Device in Random Sea*;" Procs. 13th (2203) International Offshore and Polar Eng. Conf., May 25, 2003: pp. 341-348.

(Continued)

*Primary Examiner* — Pedro J Cuevas
(74) *Attorney, Agent, or Firm* — Blakely Sokoloff Taylor & Zafman

(57) ABSTRACT

The invention concerns an apparatus for converting wave energy into electric power, comprising a closed floating element (1) and a mass forming element (2), the mass forming element (2) being arranged inside the floating element (1) and mounted mobile relative to the floating element (1), the mass forming element (2) being adapted to be set in relative motion with respect to the floating element (1) under the action of the waves on the floating element (1). The invention is characterized in that it also comprises locking means (13) adapted to lock the movement of the mass forming element (2) and control means adapted to control the locking means (13) for selectively locking or releasing the mass element (2) so as to amplify the movement of the mass forming element (2) by constant adaptation to the dynamics of the apparatus to successive waves.

21 Claims, 11 Drawing Sheets

U.S. PATENT DOCUMENTS

Figure 1:
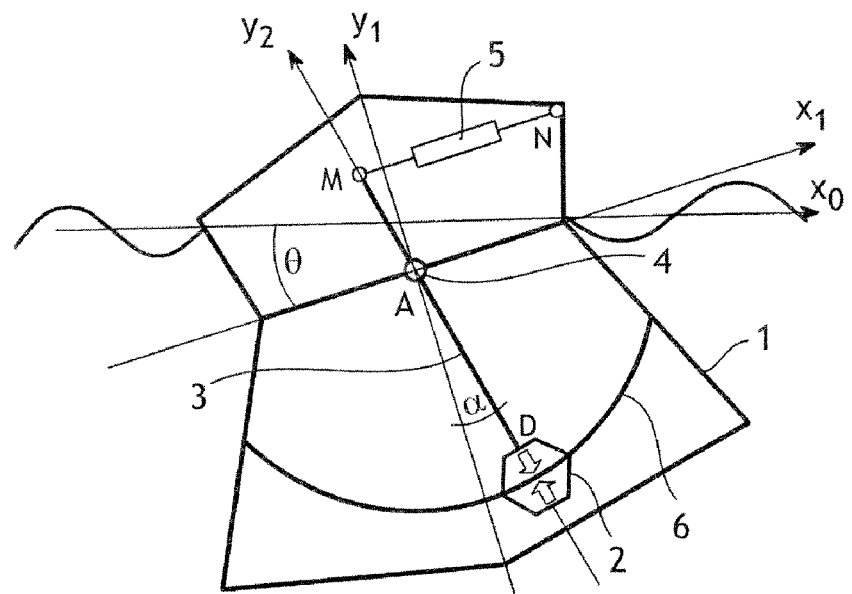

| | | | | |
|---|---|---|---|---|
| 3,706,137 | A * | 12/1972 | Wu et al. | 33/327 |
| 4,110,630 | A | 8/1978 | Hendel | 290/53 |
| 4,260,901 | A | 4/1981 | Woodbridge | 290/42 |
| 4,266,143 | A | 5/1981 | Ng | 290/53 |
| 4,288,986 | A | 9/1981 | Watson | 60/501 |
| 4,317,047 | A | 2/1982 | de Almada | 290/53 |
| 4,352,023 | A | 9/1982 | Sachs et al. | 290/42 |
| 4,423,334 | A | 12/1983 | Jacobi et al. | 290/53 |
| 4,438,343 | A | 3/1984 | Marken | 290/53 |
| 4,851,704 | A | 7/1989 | Rubi | 290/53 |
| 5,048,356 | A | 9/1991 | Levko | 74/60 |
| 5,552,657 | A | 9/1996 | Epstein et al. | 310/339 |
| 6,374,993 | B1 * | 4/2002 | Tetzloff | 198/682 |
| 6,956,299 | B2 | 10/2005 | Serrano Molina et al. | 290/42 |
| 7,003,947 | B2 | 2/2006 | Kanki | 60/398 |
| 7,105,939 | B2 | 9/2006 | Bednyak | 290/42 |
| 7,239,038 | B1 | 7/2007 | Zimmerman et al. | 290/54 |
| 7,375,436 | B1 | 5/2008 | Goldin | 290/42 |
| 7,453,165 | B2 | 11/2008 | Hench | 290/53 |
| 7,538,445 | B2 | 5/2009 | Kornbluh et al. | 290/53 |
| 7,557,456 | B2 | 7/2009 | Kornbluh et al. | 290/42 |
| 7,629,700 | B2 | 12/2009 | Begley et al. | 290/1 R |
| 7,629,704 | B2 | 12/2009 | Hench | 290/53 |
| 7,649,276 | B2 | 1/2010 | Kornbluh et al. | 290/53 |
| 7,737,569 | B2 | 6/2010 | Hench | 290/42 |
| 7,808,120 | B2 | 10/2010 | Smith | 290/42 |
| 7,989,975 | B2 * | 8/2011 | Clement et al. | 290/53 |
| 2004/0222637 | A1 | 11/2004 | Bednyak | 290/1 R |
| 2004/0222638 | A1 | 11/2004 | Bednyak | 290/1 R |
| 2007/0138793 | A1 | 6/2007 | Zimmerman et al. | 290/1 R |
| 2007/0251230 | A1 | 11/2007 | Zimmerman et al. | 60/497 |
| 2007/0257490 | A1 | 11/2007 | Kornbluh et al. | 290/53 |
| 2007/0257491 | A1 | 11/2007 | Kornbluh et al. | 290/53 |
| 2007/0273156 | A1 | 11/2007 | Miyajima et al. | 290/53 |
| 2008/0016860 | A1 | 1/2008 | Kornbluh et al. | 60/398 |
| 2008/0093858 | A1 | 4/2008 | Hench | 290/53 |
| 2008/0265582 | A1 | 10/2008 | Hench | 290/53 |
| 2009/0008942 | A1 * | 1/2009 | Clement et al. | 290/53 |
| 2009/0127856 | A1 | 5/2009 | Hench | 290/42 |
| 2009/0152870 | A1 * | 6/2009 | Shreider et al. | 290/53 |
| 2010/0102564 | A1 | 4/2010 | Hench | 290/53 |
| 2010/0123313 | A1 | 5/2010 | Hobdy | 290/42 |
| 2010/0127500 | A1 | 5/2010 | Yang | 290/53 |
| 2010/0228401 | A1 | 9/2010 | Hench | 700/287 |
| 2010/0308583 | A1 * | 12/2010 | Shreider et al. | 290/42 |
| 2010/0327595 | A1 | 12/2010 | Gottler | 290/53 |
| 2011/0022232 | A1 * | 1/2011 | Yoshiike et al. | 700/260 |
| 2011/0042949 | A1 * | 2/2011 | Laz et al. | 290/42 |
| 2011/0089689 | A1 * | 4/2011 | Gregory | 290/42 |
| 2011/0089690 | A1 * | 4/2011 | Babarit et al. | 290/42 |
| 2012/0091709 | A1 * | 4/2012 | Hobdy | 290/42 |

FOREIGN PATENT DOCUMENTS

| | | |
|---|---|---|
| FR | 2446390 | 1/1979 |
| FR | 2568947 | 2/1986 |
| GB | 905446 | 9/1962 |
| GB | 2094408 | 9/1982 |
| WO | WO-02-23039 | 3/2002 |

OTHER PUBLICATIONS

Babarit, A.; Dulcos, G.; Clement, A.H.; "*Comparison of Latching Control Strategies for a Heaving Wave Energy Device in Random Sea;*" Nov. 19, 2003; pp. 1-35.

* cited by examiner

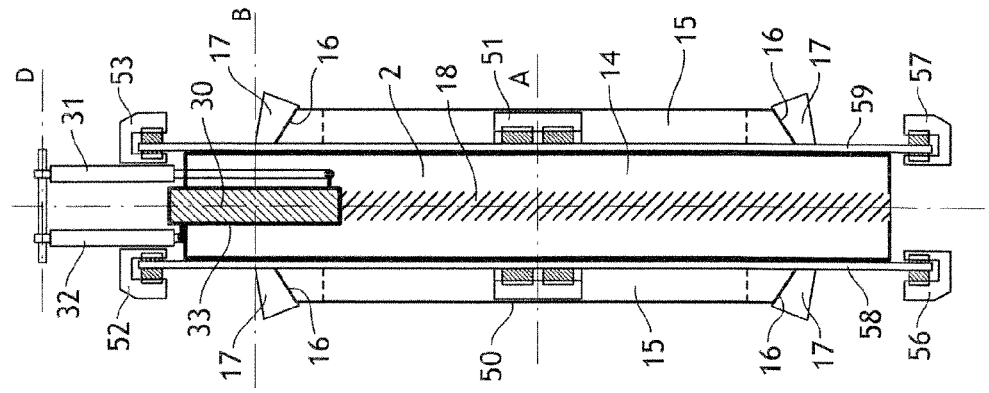
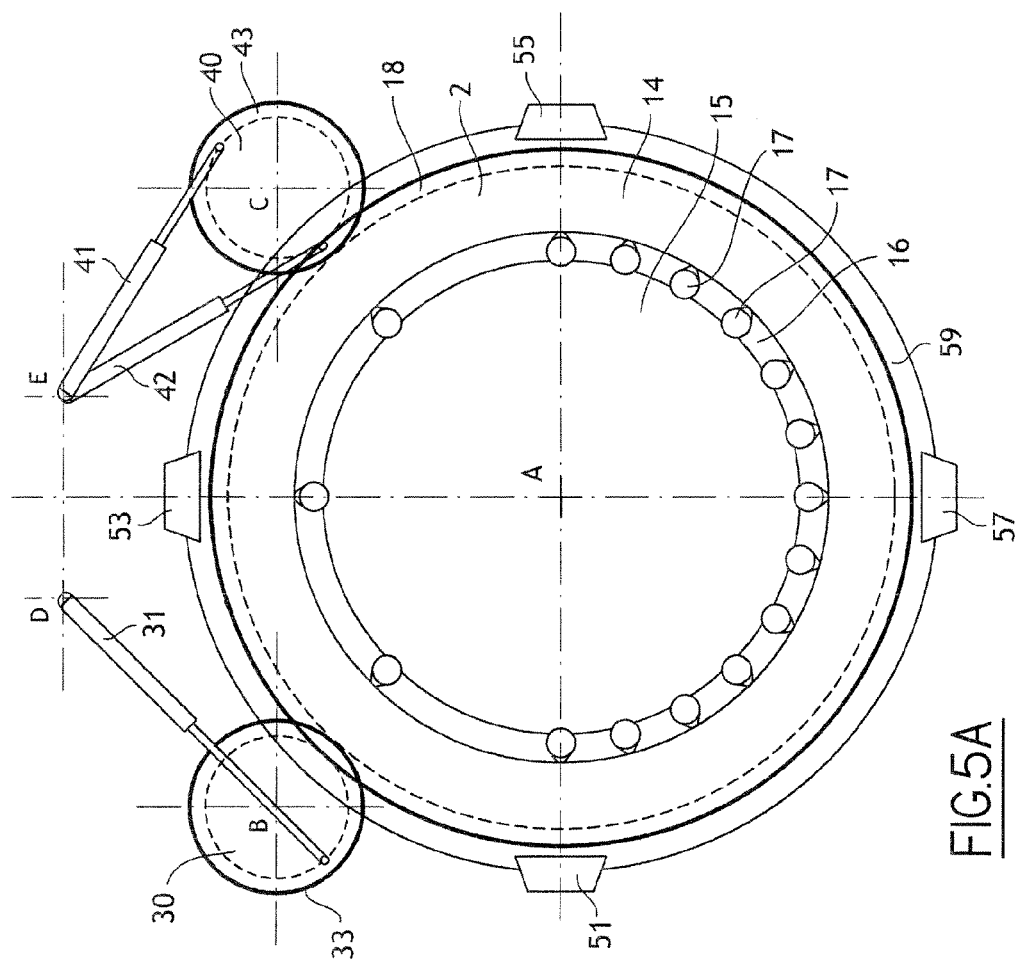
FIG.5B
FIG.5A

APPARATUS FOR CONVERTING WAVE ENERGY INTO ELECTRIC POWER

CROSS-REFERENCE TO RELATED APPLICATION

The present patent application is a continuation application claiming the benefit of application Ser. No. 11/665,444, filed Mar. 7, 2008, now U.S. Pat. No. 7,989,975, which is a non-provisional application claiming the benefit of International Application No. PCT/EP2005/055234, filed Oct. 13, 2005.

The invention concerns the area of appliances for converting wave energy into electrical energy.

These appliances, also known as "wave-power generators", are particularly interesting since they can be used to produce electricity from a renewable energy source (the potential and kinetic energy of the waves) with no emission of greenhouse gases.

The usefulness of wave-generated energy is even greater in the context of electricity supply to isolated insular sites.

Document FR 547 765 (published on 28 Jul. 1924) describes a device for collection of the energy produced by sea swell. The device includes a floating body in which is placed a mass (M) mounted to be mobile in relation to the floating body. The device also includes a power recovery device in the form of hydraulic pistons operated by the movement of the mass.

Such a device requires pneumatic braking means which are used to limit, the travel of the mass when the float is driven toward positions approaching limiting angles. These braking means prevent damage to (or even destruction of) the device in the event of high seas.

Document WO 02/23039 (published on 21 Mar. 2002) describes a wave-energy conversion device. This device includes a paddle which is designed to be driven into motion by the action of the waves, and a mass which is designed to slide in relation to the paddle.

This system needs to be adjusted so that its natural frequency matches the mean resonant frequency of the waves.

Document FR 80 00785 (published on 8 Aug. 1980) describes an appliance for the conversion of wave energy in water, and which includes two elements intended to be immersed in water, and connection means between the two elements. The two elements are designed to oscillate in relation to each other under the effect of the waves. The relative movement of the two elements is used to produce electrical energy. The appliance also includes a device for mutual locking of the elements in relation to each other. The locking device is used to lock the two elements in relation to each other during a selected period of time in each wave cycle.

The judicious use of the locking device is intended to bring about an increase in the energy produced by the appliance.

However, such an appliance is sensitive to attack by outside elements. In fact, the component parts of the appliance, and in particular the connection means that include articulation joints, are in direct contact with the water.

The value of control by latching has also been studied on a theoretical level in the following publications:

"Discrete control by latching of a wave-power generator system with one degree of freedom", A. BABARIT, G. DUCLOS, A. H. CLEMENT, paper from the 9th instance of hydrodynamic days, Poitiers, March 2003, pp. 251-264, "Comparison of latching control strategies for a heaving wave energy device in random sea", A. BABARIT, G. DUCLOS. A. H. CLEMENT, proceedings of 5th European Wave Energy Conference, Cork, 2003.

"Benefit of latching control for heaving wave energy device in random sea", A. BABARIT, G. DUCLOS, A. H CLEMENT, proceedings of 13th international Offshore and Polar Engineering Conference, ISOPE 2003, Honolulu. Vol. 1, pp. 341-348.

These studies show that control by latching theoretically allows a considerable increase to be achieved in the average power.

One problem that has been solved by the invention is the provision of an appliance to convert wave energy in water into electrical energy, which is simultaneously robust and more efficient.

To this end, the invention proposes an appliance to convert wave energy into electrical energy that includes a closed float element and a mass-forming element, with the mass-forming element being placed inside the float element and mounted to be mobile in relation to the float element, with the mass-forming element being designed to be driven into relative movement in relation to the float element under the action of the waves on the float element, characterised in that it also includes locking means designed to lock the movement of the mass-forming element, and control, means designed to control the locking means so as to selectively lock or release the mass-forming element by continuously adapting the dynamic of the appliance to the successive waves.

Since the float element is of the closed-hull type, the elements working inside it are protected from outside attack, and in particular from the action of the water. Only the exterior of the float element (the fairing) is in contact with the water. The mass-forming element is therefore driven into movement in a direct manner, by the movement of the float element.

The locking means and the control means can be used to selectively lock or release the mass-forming element so as to amplify the movement of the mass-forming element producing the energy. Amplification of the movement of the mass-forming element is achieved by the immobilisation of this mass-forming element in unfavourable periods of its oscillation cycle and its release when the initial conditions for its subsequent movement are more favourable and can be used to amplify the latter.

This characteristic is used to increase the energy output of the appliance.

The proposed appliance requires no fixed external reference, contrary to certain appliances of previous design which require the installation of a taut anchor or of superstructures fixed to the sea floor. The anchoring of the appliance, which can be similar to the mooring of a boat to an anchorage, is particularly simple and inexpensive.

Also, the appliance of the invention requires no visible superstructure, with the result that it has very little visual impact.

The appliance of the invention can advantageously have the following characteristics:

the control means are designed to control the locking means so that they lock the mass-forming element when the latter reaches a relative speed that is relatively zero in relation to the float element, the control means are designed to control the locking means so that they lock the mass-forming element for a locked period that is calculated as a function of the movement of the float element, the mass-forming element is free to rotate about a rotation axis, with the movement of the mass-forming element not being limited by a limiting device, the mass-forming element has a form of revolution that has an axis of revolution, and the mass-forming element is able to rotate upon itself in relation to the float element about this axis of revolution, the mass-forming element has a generally cylindrical shape and is able to rotate upon itself in relation to the float element about the axis of the cylinder, the mass-forming element has a centre of gravity that is eccentric in relation to the axis of revolution, the appliance includes a power recovery device that includes at least one rotating wheel in contact with the mass-forming element, the power recovery device includes a generator connected to the rotating wheel, the appliance includes a power recovery device that includes a multiplicity of windings and a multiplicity of magnets positioned on the mass-forming element and on the float element in such a manner that when the mass-forming element is driven in rotation in relation to the float element, an electric current is generated in the windings, the float element includes a top part surmounting a bottom part, with the bottom part containing the mass-forming element, the bottom part has a generally flat cylindrical shape, the top part is of flared shape which broadens toward the top, the top part is of flared shape which broadens toward the top below the waterline, and a profiled shape without a superstructure above the waterline so as to minimise the damaging action of the breaking waves in extreme sea conditions, the float element is profiled in such a manner that when the appliance is immersed in water and moored by a single line, it is naturally orientated in relation to the main propagation direction of the waves so as to obtain maximum driving of the mass-forming element, a mass-forming element mounted to rotate upon a rotation axis in relation to the float element, with the appliance being orientated naturally so that the rotation axis is substantially perpendicular to the main propagation direction of the waves, the appliance includes several mass-forming elements, mounted to be mobile in relation to the float element, with each mass-forming element being designed to be driven into movement in relation to the float element under the action of the waves on the float element, and locking means associated with each mass-forming element, with control means that are designed to control the locking means so as to selectively lock or release each of the mass-forming elements.

In addition, the invention also concerns a method to convert wave energy into electrical energy from an appliance that includes a closed float element and a mass-forming element, with the mass-forming element being placed inside the float element and mounted to be mobile in relation to the float element, with the mass-forming element being designed to be driven into movement in relation to the float element under the action of the waves on the float element, characterised in that it includes stages that consist of controlling the locking means that are designed to lock the movement of the mass-forming element by means of control means so as to selectively lock or release the mass-forming element in order to amplify the movement of the mass-forming element by continuously adapting the dynamic of the appliance to the successive waves.

The method of the invention can advantageously include stages in which:

measuring means regularly transmit, to processing means, data that include the values of parameters relating to the movements of the float element and of the mass-forming element, the processing means determine the values of the dominant excitation frequency of the waves at a later time, as a function of the measured parameter values, the control means control, the locking means so that they lock the mass-forming element at the instant when the mass-forming element reaches a zero relative speed in relation to the float element, the processing means determine an optimum locking period for the mass-forming element, as a function the values of the dominant excitation frequency of the waves, the control means control the locking means to release the mass-forming element when the timing counter has reached the optimum period.

In one implementation of this method, in order to determine the optimum locking period of the mass-forming 2b element, the processing means look up a pre-established table containing locking time values as a function of the value of the frequency of excitation of the waves at a later time.

In addition, the locking time values may have been determined for a regular swell and for the appliance in question.

Figure 2:
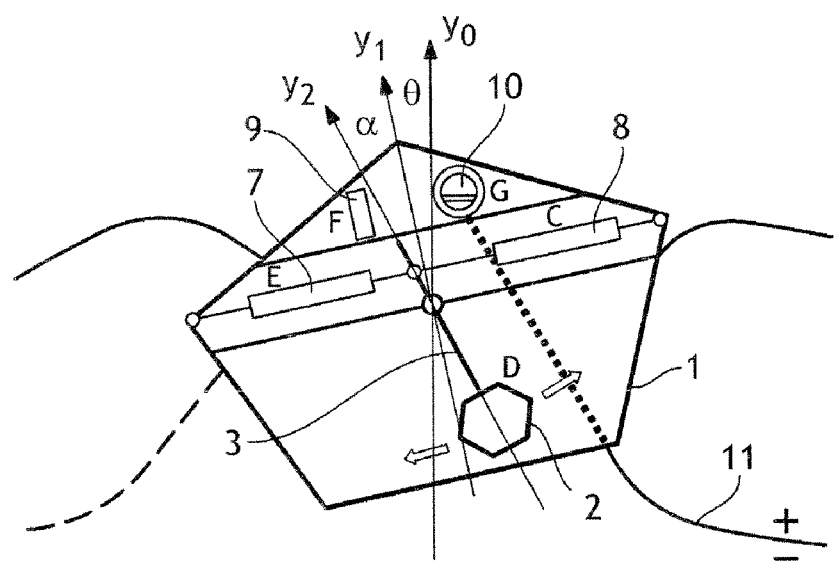
Figure 3:
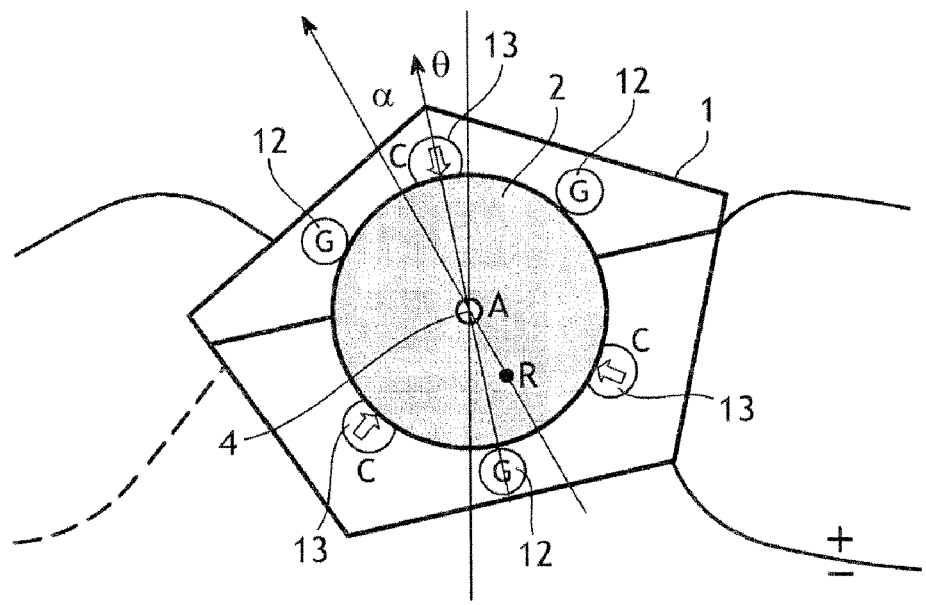
Figure 4:
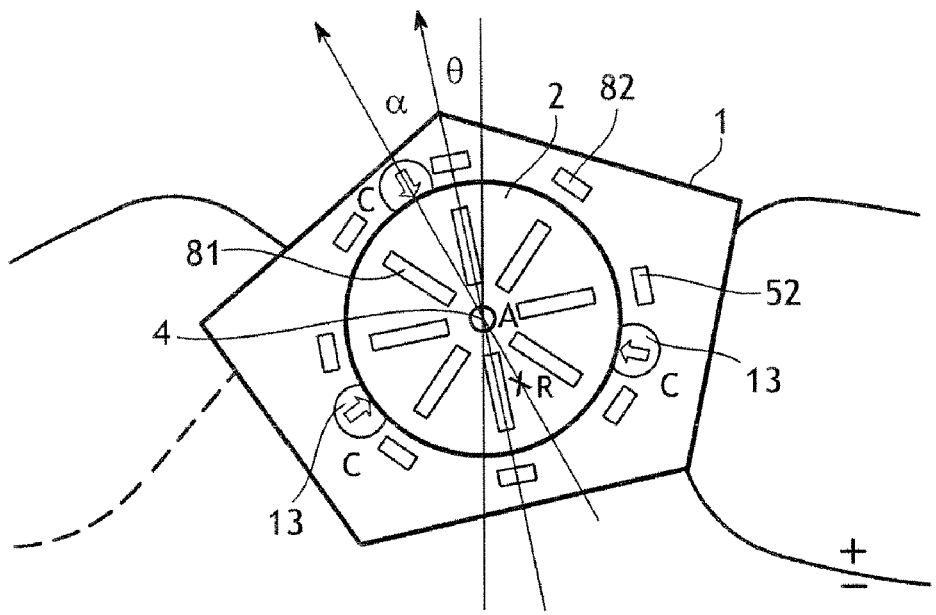

Other characteristics and advantages of the invention will emerge from the description that follows, which is purely illustrative and non-limiting, and which should be read with reference to the appended drawings, in which:

FIG. 1 is a principles diagram of an appliance for the conversion of wave energy according to a first possible embodiment of the invention, FIG. 2 is a principles diagram of a variant of the appliance of FIG. 1, FIG. 3 is a principles diagram of a power recovery device for the conversion of wave energy according to a second possible embodiment of the invention, FIG. 4 is a principles diagram of a variant of the appliance of FIG. 3.

Figure 6:
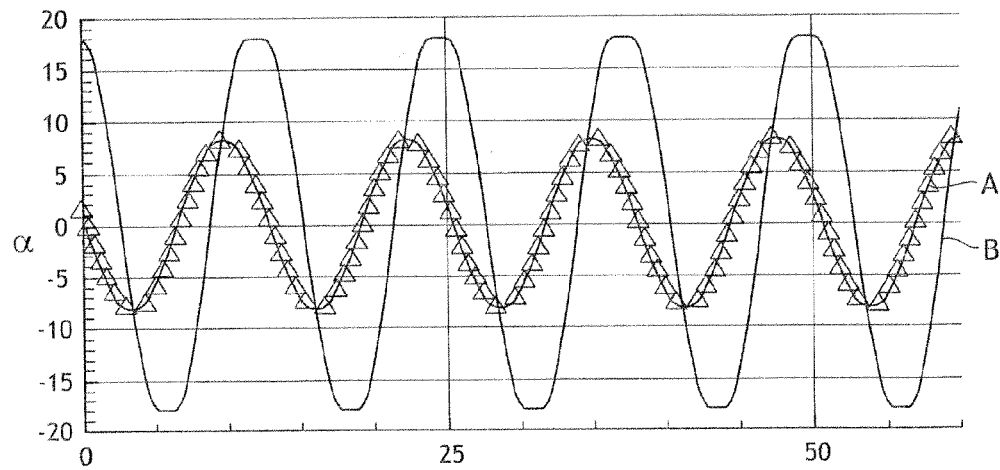

FIG. 5A schematically represents a front view of one example of the embodiment of the internal mechanism of the appliance of FIG. 3, FIG. 5B schematically represents a side view of the mechanism of FIG. 5A, FIG. 6 is a diagram illustrating the oscillation of the mass-forming element in an appliance for the conversion of wave energy, when the mass-forming element is left free or when it is controlled by the locking means, in a regular swell.

Figure 7:
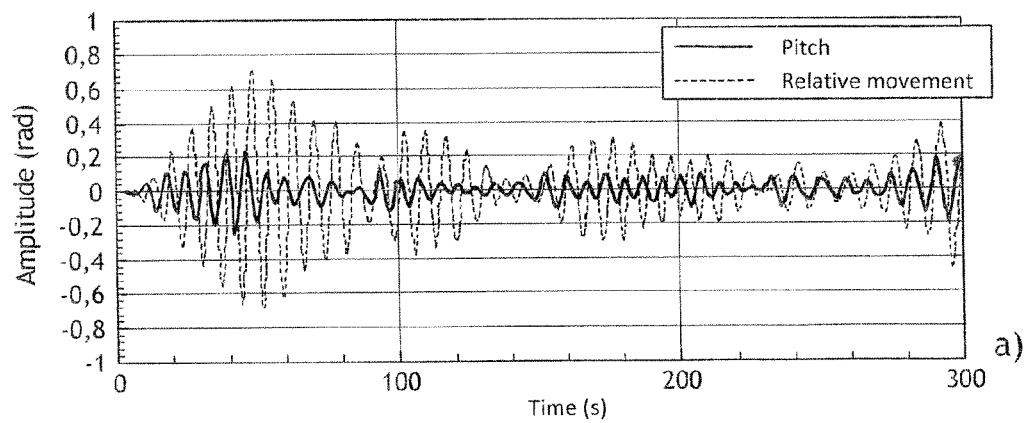
Figure 7:
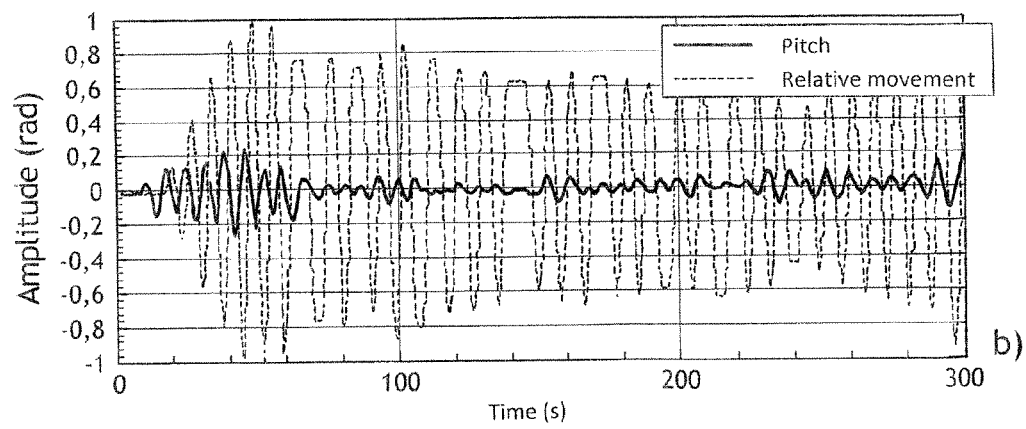
Figure 8:
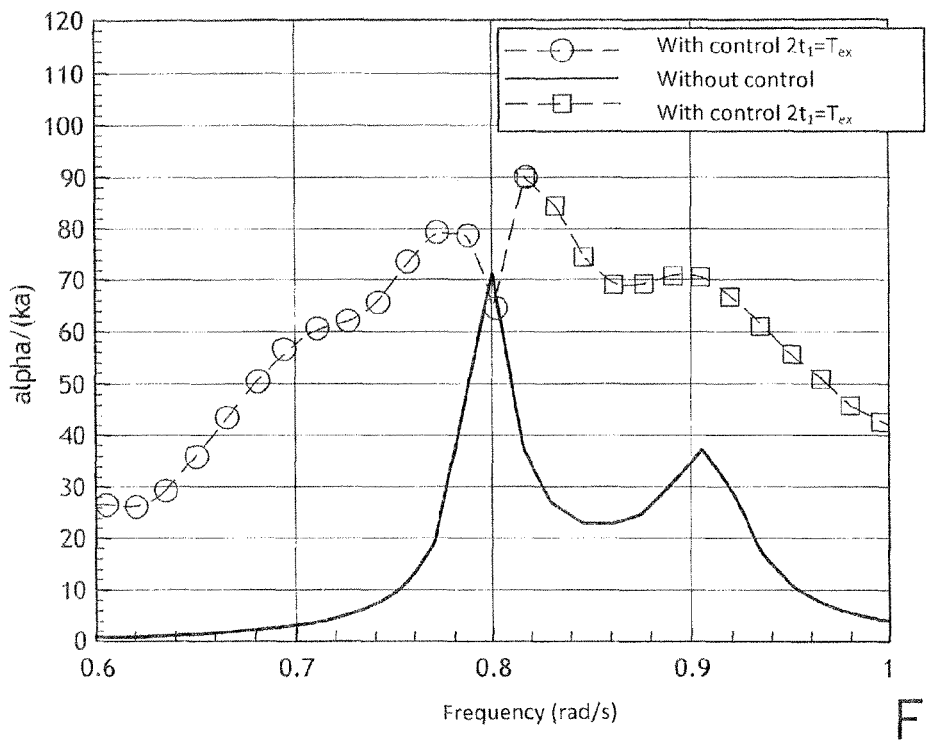
Figure 9:
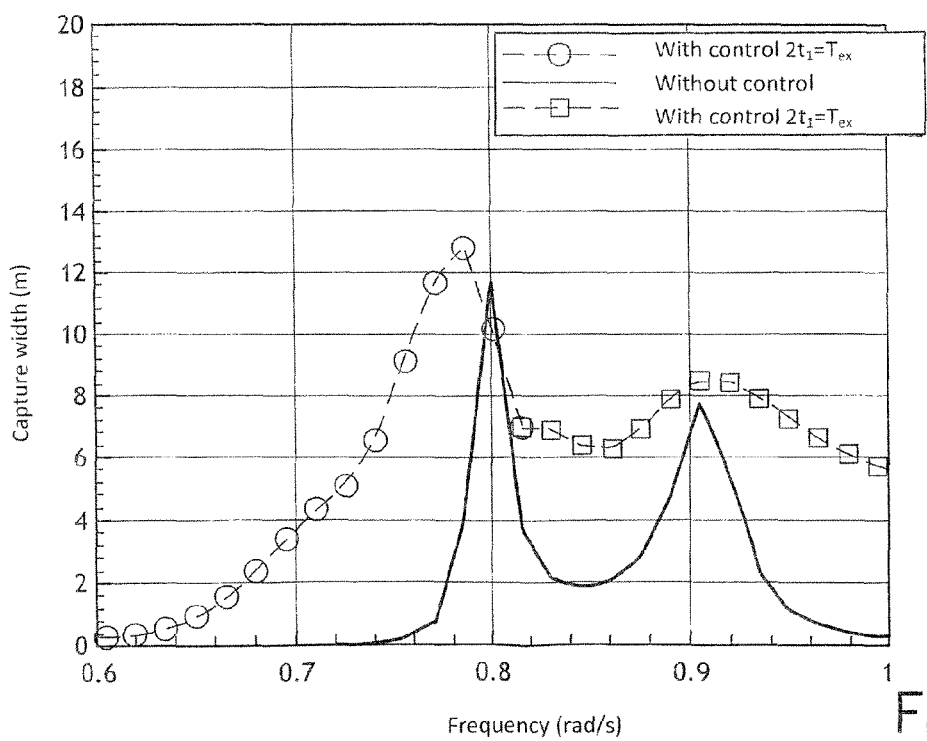
Figure 10:
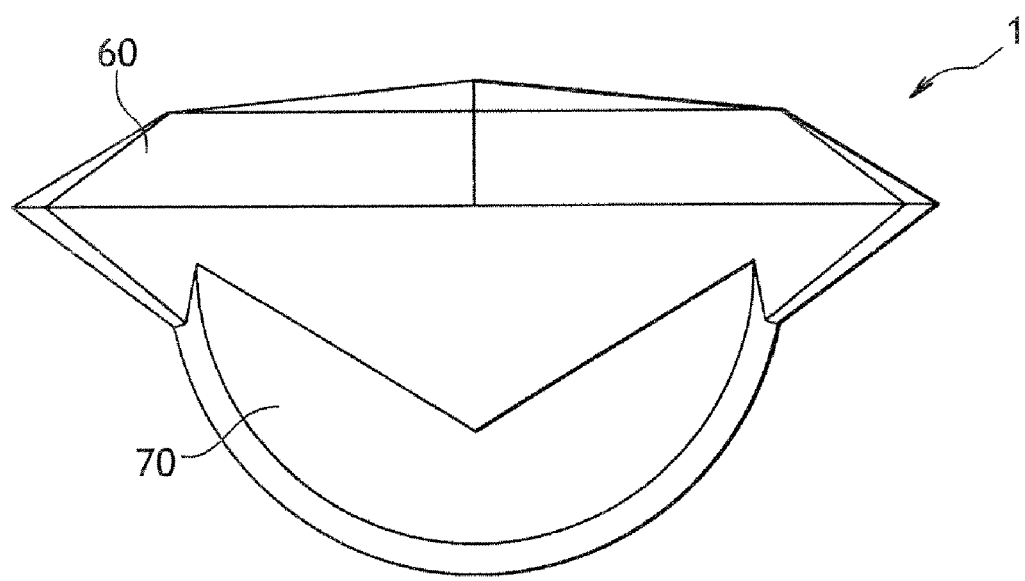
Figure 11:
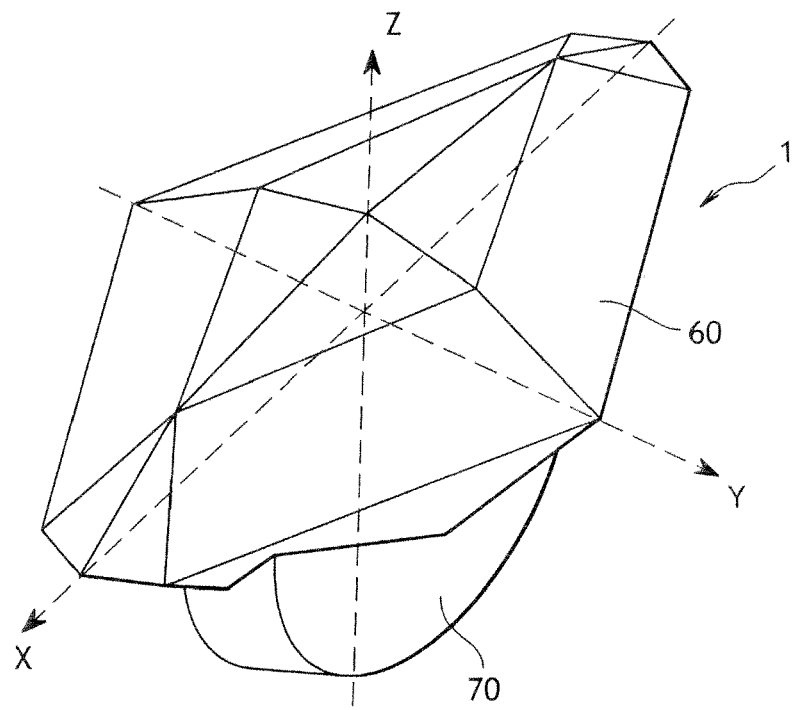
Figure 12:
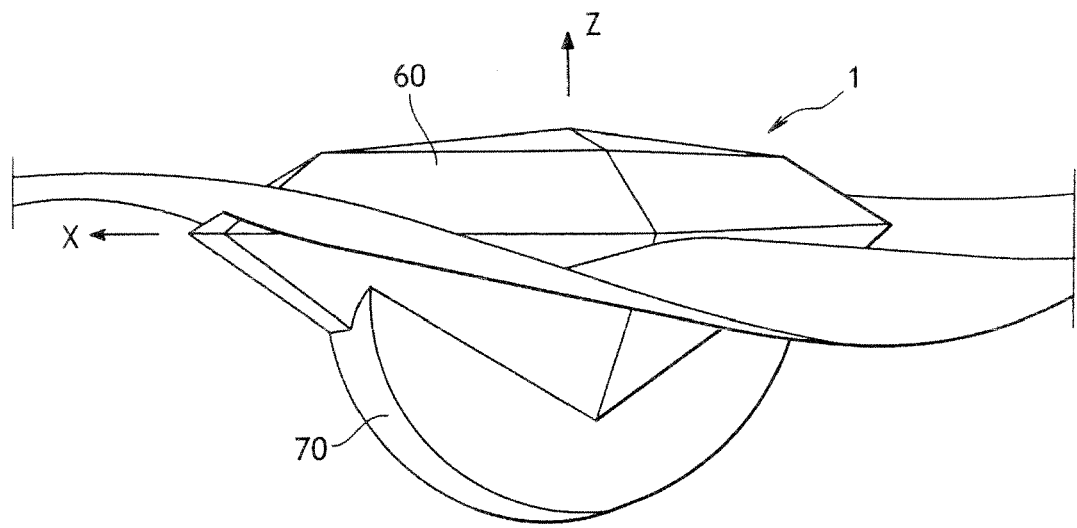
Figure 13:
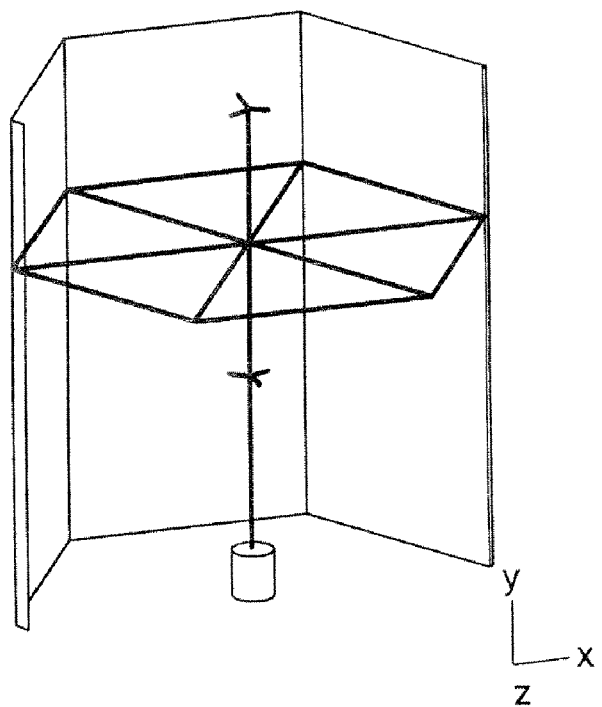
Figure 14:
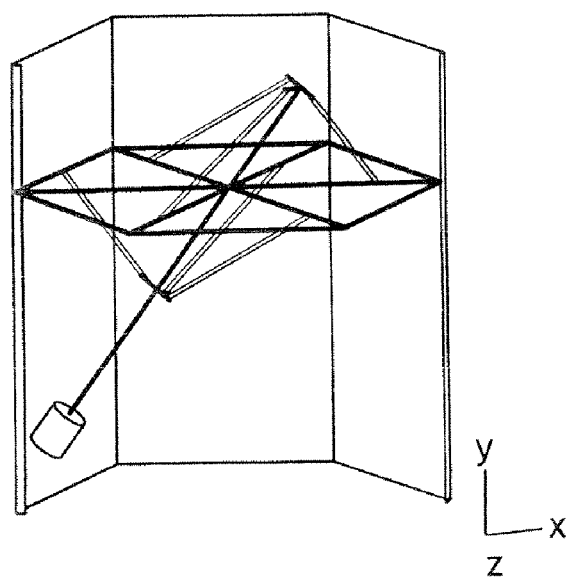
Figure 15:
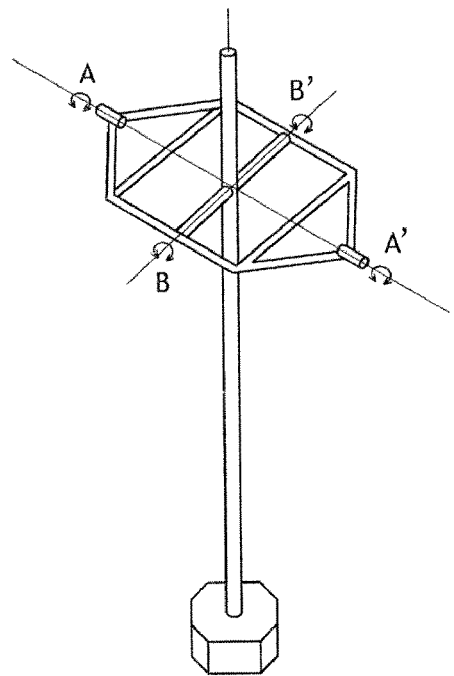
Figure 16:
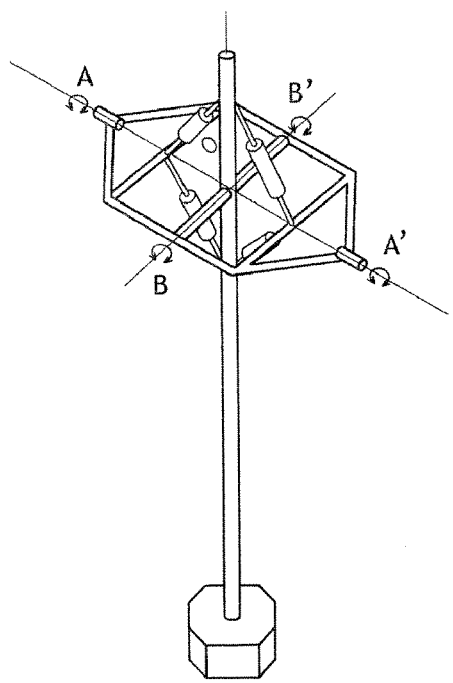
Figure 17:
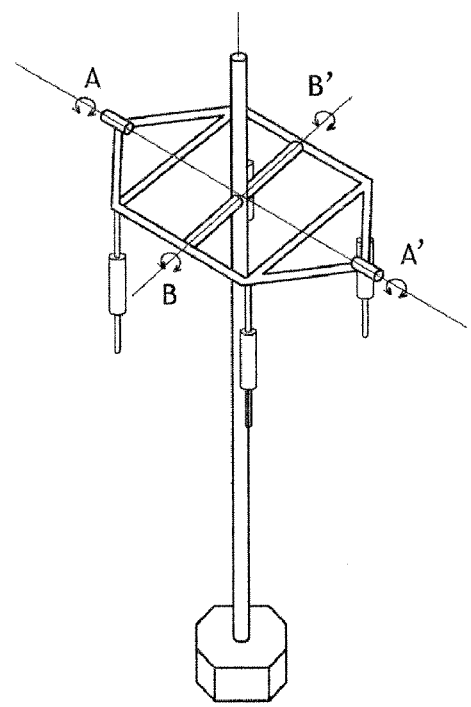
Figure 18:
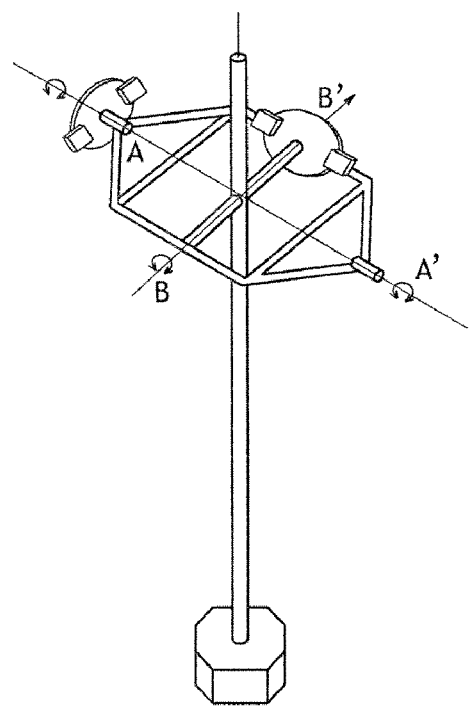
Figure 19:
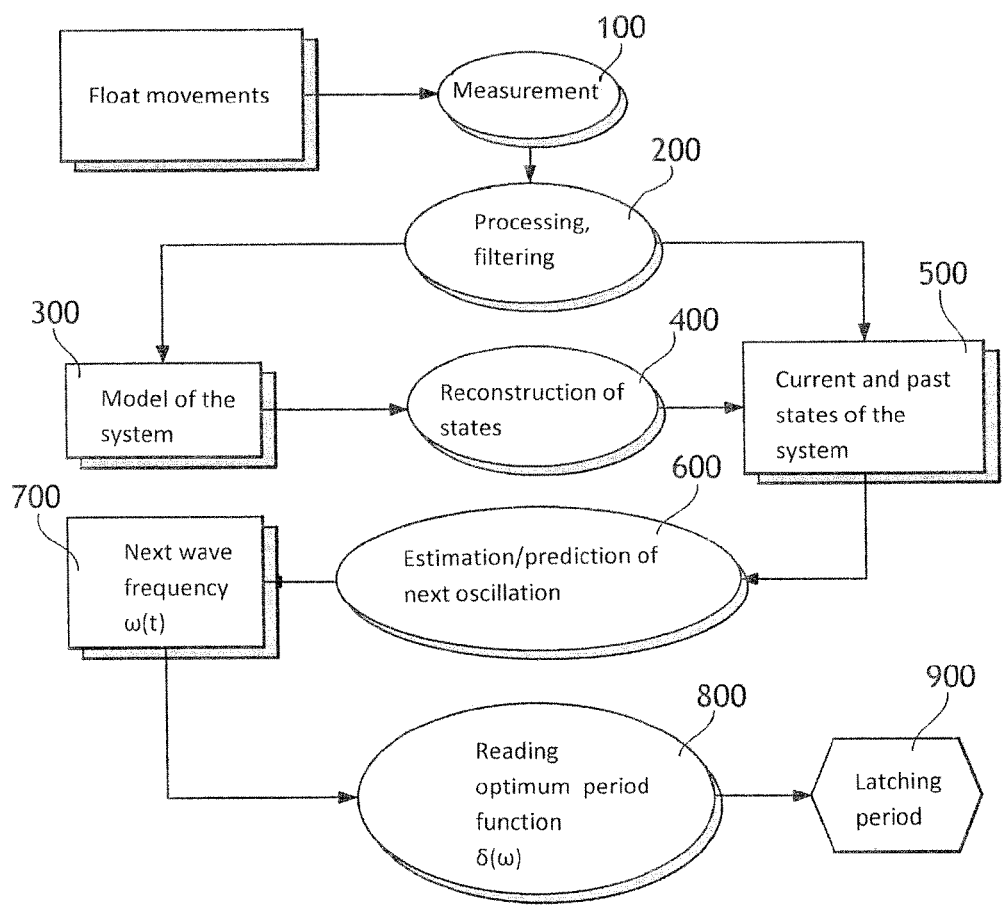

FIG. 7 is a diagram illustrating the amplitude of the oscillations of the float element and of the mass-forming element when the mass-forming element is left free or when it is controlled by the locking means, in an irregular swell, FIG. 8 is a diagram illustrating the amplification of the amplitude of the oscillations of the mass-forming element in relation to the float element in the wave-energy conversion device of FIGS. 3 to 5, in a regular swell, as a function of the frequency of the swell, when the mass-forming element is left free or when it is controlled by the locking means, FIG. 9 is a diagram illustrating the power absorbed by the wave-energy conversion device of FIGS. 3 to 5, expressed in terms of capture width, in a regular swell, as a function of the frequency of the swell, when the mass-forming element is left free or when it is controlled by the locking means, FIGS. 10 to 12 schematically represent a float element intended to be used in the second embodiment of the wave-energy conversion device of the invention, FIG. 13 schematically represents the internal mechanism of a wave-energy conversion device according to a fourth possible embodiment of the invention, in which the mass-forming element is suspended by a swivel link to the float, FIG. 14 schematically represents a first power recovery device in the appliance of FIG. 13, FIG. 15 schematically represents the internal mechanism of a wave-energy conversion device according to a fifth possible embodiment of the invention, in which the mass-forming element is suspended by a universal joint to the float, FIGS. 16 and 17 schematically represent means for the recovery of energy in the appliance of FIG. 15, FIG. 18 schematically represents locking means in the appliance of FIG. 15, FIG. 19 is a diagram representing the different stages of the method for controlling the locking means in a wave-energy conversion device according to the invention.

According to a first embodiment represented in FIG. 1, the appliance for the conversion of wave energy into electrical energy includes a closed float element 1 intended to be immersed in water, and a mass-forming element 2 placed inside the float element 1. The appliance also includes a rod 3 at one end D of which is attached the mass-forming element 2. The rod 2 is mounted to rotate in relation to the float element 1 about a rotation axis 4.

The appliance of FIG. 1 also includes a power recovery device 5 fixed firstly to the end M of the rod 3 opposite to the end D to which the mass-forming element 2 is attached, and secondly to a fixed point N of the float element 1.

The appliance of FIG. 1 also includes a guide rail 6 along which the mass-forming element 2 is able to slide. Finally, the appliance includes locking means designed to lock the movement of the mass-forming element along the rail 6 (the locking means being symbolized by a double arrow), as well as control means (not shown) designed to control the locking means so as to selectively lock or release the mass-forming element 2.

In operation, the mass-forming element 2 is designed to be driven into movement in relation to the float element 1 under the action of the waves on the float element 1. The waves set the float element 1 into motion (linear movements on the horizontal x axis and on the vertical y axis, and a pitching motion through angle $\theta$), leading to the driving into motion of the mass-forming element 2 (rotation through angle $\alpha$ about the axis 4 in relation to the float element 1. The mass-forming element 2 moves along the rail 6 and oscillates in line with the action of the waves on the float element 1. In the course of its movement, the mass-forming element 2 causes the rod 3 to rotate, which operates the power recovery device 5.

According to a variant of the first embodiment represented in FIG. 2, the power recovery device is of the indirect generation type. The power recovery device includes pumping means 7 and 8 for a fluid (water, oil or air) which, when they are operated by the rotating motion of the rod 3, cause pressurization of the fluid stored in an accumulator 9. The pressurised fluid stored in the accumulator 9 is then used to drive an electric generator 10. The electrical energy supplied by the electric generator is transmitted to land by means of a submarine cable 11 connected to the float element 2.

The control means are designed to control the locking means so that they lock the mass-forming element 2 when the latter reaches a zero speed ($\alpha=0$) in relation to the float element 1. More precisely, the control means are designed to control the locking means so that they lock the mass-forming element 2 for a predetermined locked period, with the said predetermined locked period being calculated in real time as a function of the movement of the float element 1.

FIG. 3 schematically represents a second particularly advantageous embodiment of an appliance according to the invention. In this embodiment, the rotating motion of the mass-forming element 2 has no limits.

As illustrated in FIG. 3, the mass-forming element 2 has a form of revolution with an axis of revolution 4. More particularly, the mass-forming element 2 has a generally cylindrical shape. The mass-forming element 2 is able to rotate upon itself in relation to the float element 1 about the axis of revolution 4 which is the axis of the cylinder itself. The mass-forming element has a centre of gravity R that is eccentric in relation to its axis of revolution 4.

The appliance represented in FIG. 3 includes a power recovery device that includes a multiplicity of rotating wheels 12 in contact with the mass-forming element 2. The rotating motion of the mass-forming element 2 drives the rotation of the wheels 12. The wheels operate an electric generator connected to the rotating wheels. The appliance represented in FIG. 3 also includes locking means 13 distributed about the mass-forming element 2.

In the appliance represented in FIG. 3, the rotation of the mass-forming element 2 is not limited either by the internal space of the float element 1, or by the power recovery device. Thus, such an appliance requires no limiting devices. In the event of a heavy swell, the mass-forming element 2 is able to perform a full rotation on itself without damaging the structure of the appliance. This is why the appliance according to this third embodiment is particularly robust in comparison with the appliances of previous design.

In addition, the provision of a mass-forming element that has a large diameter in relation to the diameter of the wheels leads to a large gearing down of the speed of rotation of the mass-forming element by the wheels. This arrangement is used to obtain a high efficiency of the power recovery device.

Furthermore, the arrangement of the locking means at the periphery of the mass-forming element 2 results in a gearing down of the locking torque generated, and thus a high effectiveness of the locking action. This arrangement therefore minimises the dimensions of the locking means.

FIG. 4 schematically represents a variant of appliance of FIG. 3, in which the power recovery device is of direct electricity generating type.

The power recovery device includes a multiplicity of magnets 81 positioned on the mass-forming element 2 and positioned in star configuration about the axis of revolution 4. The power recovery device also includes a multiplicity of windings 82 positioned about the mass-forming element 2 in a fixed manner in relation to the float element 1.

In this variant, the float element 1 and the mass forming element 2 are comparable to the stator and the rotor of an electric generator. When the mass-forming element 2 is driven in rotation in relation to the float element 1, the windings subjected to a variable magnetic field develop an electrical potential at their ends and an electric current is generated in the windings 82.

FIGS. 5A and 5B schematically represent, in a front view and a side view respectively, an example of the embodiment of the internal mechanism of the appliance of FIG. 3.

In this embodiment, the mechanism includes a mass-forming element 2 that has a form of revolution on axis A, with the mass-forming element 2 including a part of generally cylindrical shape 14 and two lateral flanges 15 arranged on either side of the cylindrical part 14 on two plane faces of the cylindrical part 14. Each flange 15 has a generally conical shape and includes a bearing surface 16 that is angled in relation to the lateral face of the cylindrical part 14 on which the flange 15 is located.

The mechanism also includes conical rollers 17 positioned around each of the flanges 15 in contact with the bearing surfaces 16, in such a manner that the mass-forming element 2 is resting pressed against the rollers 17 by means of the bearing surfaces 16. The rollers 17 have as their function to support the mass-forming element 2 and to guide the mass-forming element 2 in its rotating motion about axis A.

In addition, the mass-forming element 2 is equipped, on the circumference of the cylindrical part 14, with a ring of gear teeth 18.

The mechanism also includes a power recovery device. The power recovery device includes two sprocket wheels 30 and 40 of generally cylindrical shape. The sprocket wheels 30 and 40 are mounted to rotate about axes B and C respectively. Each sprocket wheel 30 and 40 is equipped on its circumference with a ring of gear teeth 33 and 43. The sprocket wheels 30 and 40 are positioned in relation to the mass-forming element 2 in such a manner that the teeth 33 and 43 of each of the sprocket wheels 30 and 40 mate with the teeth 18 of the mass-forming element 2 and that each sprocket wheel 30, 40 meshes with the mass-forming element 2.

The power recovery device also includes hydraulic actuators 31, 32, 41, 42. Each sprocket wheel 30, 40 is associated with one pair of hydraulic actuators 31, 32 and 41, 42. The hydraulic actuators 31, 32; 41, 42 of a given pair are located on either side of the associated sprocket wheel 30, 40. The hydraulic actuators 31, 32; 41, 42 of a given pair have one end connected to a given axis of rotation D, E and the other end connected to a given sprocket wheel 30, 40 at a point that is eccentric in relation to the rotation axis B, C of the sprocket wheel. A continuous rotating movement of a sprocket wheel 30, 40 causes an alternating rectilinear movement of the actuators 31, 32; 41, 42 that are connected to it.

It will be seen that the actuators of a given pair 31, 32; 41, 42 are connected to the corresponding sprocket wheel 30, 40 at two diametrically opposite points of the sprocket wheel. Thus, when one of the actuators of a pair is in an extreme position of its travel (in a position of maximum compression for example), the other actuator of the pair is in an extreme opposite position (position of maximum extension).

It will also be seen that the sprocket wheels 30, 40 and the actuators 31, 32, 41, 42 are arranged in such a manner that when the actuators of a given pair (actuators 31 and 32 associated with sprocket wheel 30 for example) are in the extreme travel positions, the actuators of the other pair (actuators 41 and 42 associated with sprocket wheel 40) are in intermediate positions. More precisely, the actuators of the other pair (actuators 41 and 42) are in a position of equal extension.

In operation, the mass forming element 2 to driven in alternating rotation about axis A in relation to the float element, under the action of the waves on the float element. The rotation of the mass-forming element 2 drives the rotation of the sprocket wheels 30 and 40. The rotation of the sprocket wheels 30 and 40 drives the oscillation of the actuators 31, 32, 41, 42. Due to the particular arrangement of the sprocket wheels 30, 40 and of the actuators 31, 32, 41, 42, the actuators 31, 32, 41, 42 oscillate out of phase with each other.

The actuators 31, 32, 41, 42 operate a power recovery device that is designed to convert their translation movement into electrical energy.

Furthermore, the mechanism represented in FIGS. 5A and 5B includes locking means. The locking means include two brake disks 58 and 59, where each brake disk 58, 59 is of generally flat circular shape. The brake disks 58, 59 are fixed on either side of the cylindrical part 14 of the mass-forming element 2, on each of the faces of the cylindrical part 14. The locking means also include stirrups 50, 52, 54, 56 and 51, 53, 55, 57 fitted with brake pads and distributed respectively around the brake disks 58 and 59. The stirrups 50, 52, 54, 56 and 51, 53, 55, 57 are designed to be controlled by control so as to press against the brake disk 58, 59 in order to immobilise the mass-forming element 2 in position.

Creation of a Table of Locking Times

We are now going to describe a method that will be used to create a table of the values of optimum locking times $\hat{\delta}$ for a wave-energy conversion device. This table is created for excitation of the appliance by a regular swell. This pre-established table is used by the control means in the method for controlling the locking means.

When the wave-power generator appliance is in operation on the waves, the rotating motion, of angle α, of the mass-forming element in relation to the float element is an oscillating movement (a to-and-fro movement) that has a dead point at which the speed of rotation $\dot{\alpha}$ is zero at the end of each cycle.

The control principle proposed to increase the relative rotating motion of angle α of the mobile mass-forming element in relation to the float element (and consequently the energy produced) is as follows: we wait until the movement of the mobile mass reaches zero speed (the dead point) and then we lock this movement at that instant. We allow a certain time δ to elapse and we then release the mobile mass-forming element, which is then able to start its next oscillation. It, is therefore necessary to determine the optimum locking period $\hat{\delta}$, for each cycle of movement, in real time.

Onboard measuring means continuously measure the following six elementary movement parameters of the float element:
  a shuttle parameter (front-to-back motion),
  a yaw parameter (port starboard motion),
  a bump parameter (up-down motion),
  a roll parameter (rotation about the shuttle axis),
  a pitch parameter (rotation about the yaw axis),
  a twist parameter (rotation about the twist axis).

The measuring means also measure the relative angle α of the mobile mass-forming element in relation to the float element.

We will consider the case of a regular sinusoidal swell of small amplitude, of pulse amplitude ω (therefore of frequency ω/2π and of amplitude 2π/ω, driving the appliance for a time that is long enough so that a permanent periodic regime has had time to establish itself. In this case, the optimum locking time $\hat{\delta}$ is a function only of parameter ω of the incident swell.

It can be seen that:
  d is the distance between the rotation axis of the mass-forming element and the centre of gravity of the float element,
  l is the distance between the rotation axis of the mobile mass-forming element and its own centre of gravity,
  $m_b$ is the mass of the float element,
  $I_b$ is the moment of inertia of the float element in rotation about its centre of gravity,
  $z_G$ in the vertical coordinate of the centre of gravity of the float element,
  $x_G$ the horizontal coordinate of the centre of gravity of the float element.
  θ the angle of rotation of the float element in relation to the vertical direction,
  α is the angle of rotation of the mass forming element in relation to the vertical axis of symmetry of the float element,
  $m_p$ is the mass of the mass-forming element
  $I_y$ is the moment of inertia of the mass-forming element in relation to its centre of gravity R, $K_{PTO}$ is the linearised stiffness of the power recovery device (hydraulic actuators), $k_x$ is the equivalent horizontal stiffness of the mooring of the appliance, $B_{PTO}$ is the linearised damping of the power recovery device.

Assume that:

$$X=(x_G, z_G, \theta, \alpha)^t \quad [1]$$

After linearising the equations of the mechanics by assuming that the movements about the position of static equilibrium are small, we can put the equation for the movement, of the assembly in the form of the following matrix differential equation:

$$(M+\mu_\infty)\ddot{X}=F_{ex}-I-(K_h+K_a+K_p)X-P\dot{X} \quad [2]$$

Where:

$F_{ex}$ is the generalised driving force due to the action of the swell on the float element when the float element is immobile, which takes the form:

$$F_{ex} = \sum_{i=1}^{N} a_i \mathcal{F}\left(\begin{pmatrix} F_{I+D,1}(\omega_i) \\ F_{I+D,3}(\omega_i) \\ F_{I+D,5}(\omega_i) \\ 0 \end{pmatrix} e^{i(\omega_i t + \varphi_0)}\right) \quad [3]$$

M is the generalised mass matrix which takes the form:

$$M = \begin{pmatrix} m_b+m_p & 0 & m_p(d-l) & m_p l \\ 0 & m_b+m_p & 0 & 0 \\ m_p(d-l) & 0 & I_b+I_y+m_p(d-l)^2 & I_y+m_p l^2 - m_p dl \\ -m_p l & 0 & I_y+m_p l^2 - m_p dl & I_y+m_p l^2 \end{pmatrix} \quad [4]$$

$K_h$, $K_a$ is the matrix of hydrostatic and mooring stiffnesses which takes the form:

$$(K_h+K_a) = \begin{pmatrix} K_{H,11}+k_x & K_{H,13} & K_{H,15} & 0 \\ K_{H,13} & K_{H,33} & K_{H,35} & 0 \\ K_{H,15} & K_{H,35} & K_{H,55} & 0 \\ 0 & 0 & 0 & 0 \end{pmatrix} \quad [5]$$

$K_p$ is the stiffness of the return force applied by the mass-forming element on the float, element, which takes the form:

$$K_p = \begin{pmatrix} 0 & 0 & 0 & 0 \\ 0 & 0 & 0 & 0 \\ 0 & 0 & -m_g(d-l) & m_p gl \\ 0 & 0 & m_p gl & m_p gl + K_{PTO} \end{pmatrix} \quad [6]$$

P is the linearised damping associated with the power recovery device producing the electricity, which takes the form:

$$P = \begin{pmatrix} 0 & 0 & 0 & 0 \\ 0 & 0 & 0 & 0 \\ 0 & 0 & 0 & 0 \\ 0 & 0 & 0 & B_{PTO} \end{pmatrix} \quad [7]$$

Matrix $\mu_\infty$ and vector I represent the hydrodynamic forces due to the movements of the float element in the water. They are obtained in this differential form from their formulation by convolution integral (Cummins integral) by applying an identification by summing the exponentials at the cores of these integrals. Their integral formulation can be obtained by using hydrodynamic calculation software working in the frequency domain (giving added mass and hydrodynamic damping), or in the time domain (directly giving the impulse responses that appear in these integrals).

Reference can be made to the following publication for further information on this subject:

"Using differential properties of the Green function in seakeeping computational codes", A. H. CLEMENT Proceedings of 7th international conference Numer. Ship Hydrod, Nantes. (1999), pp. 6.5-1-6.5-15.

For its part, the method of identification by summing exponentials using the Prony algorithm is described in the appendix of the following publication:

"Absorption of outgoing waves in a numerical wave tank using a self-adaptive boundary condition", G. DUCLOS, A. H. CLEMENT, G. CHATRY, Int. Journal of Offshore and Polar Engineering (2001), Vol. 11, No. 3, pp. 168-175. ISSN 1053-5381.

After these preliminary calculations, we therefore have access to:

$$\mu_\infty = \begin{pmatrix} \mu_{\infty,11} & \mu_{\infty,13} & \mu_{\infty,15} & 0 \\ \mu_{\infty,13} & \mu_{\infty,33} & \mu_{\infty,35} & 0 \\ \mu_{\infty,15} & \mu_{\infty,35} & \mu_{\infty,55} & 0 \\ 0 & 0 & 0 & 0 \end{pmatrix} \quad [7]$$

and:

$$I(t) = \sum_{j=\{1,3,5\}} \begin{pmatrix} \sum_{r=1}^{N_{i,j}} I_{1,jr} \\ \sum_{r=1}^{N_{i,j}} I_{3,jr} \\ \sum_{r=1}^{N_{i,j}} I_{5,jr} \\ 0 \end{pmatrix} \quad [8]$$

In order to arrive at a state equation in its conventional form, we can write equation [2] in the more compact form of a first-order matrix differential equation with real coefficients by multiplying the terms by $(M+\mu_\infty)^{-t}$. We then get:

$$\dot{X}=AX+\Re(Be^{i(\omega t+\phi_0)}) \quad [9]$$

where X is now the extended state vector:

$$X=(x_G \dot{x}_G z_G \dot{z}_G \theta \dot{\theta} \alpha \dot{\alpha} I_1^R I_1^I \ldots I_N^R I_N^I)^t \quad [10]$$

$I^R$ and $I^I$ designate the real and imaginary parts of the complex states $I_j$.

Relation [9] governs the operation of the assembly (float element+mass-forming element) driven by a regular swell of amplitude $\omega$, propagating in the axis of the system, during the times when the mass-forming element is not locked.

During the locked periods, relation [9] is slightly different and simplified. The only equations corresponding to the relative movement α of the mass-forming element (movement producing energy) is simplified as follows:

$$\begin{cases} \dot{\alpha} = 0 \\ \alpha = \alpha(0) \end{cases} \quad [11]$$

where t=0 represents the instant of locking. By substituting the corresponding coefficients into relation [9], we get another differential equation, which will be valid during the locked periods of the mobile mass-forming element:

$$\dot{X} = AX + \Re(B' e^{i(\omega t + \phi_0)}) \quad [12]$$

In general, if we apply an initial condition $X_i = X(t_{=t_i})$, then the solution of equation [9] after this instant can be written as:

$$X(t) = \exp(A(t-t_i)) \cdot X_i + \Re((I \cdot e^{i\omega(t-t_i)} - \exp(A(t-t_i)) \cdot (i\omega I - A)^{-1} \cdot B \cdot e^{i(\omega t_i + \phi_0)}) \quad [13]$$

In order to determine the optimum locking period in these conditions of established periodic working in a regular swell, we can then proceed in the following way.

The regime that we are seeking is an alternation of locked and released modes for the mass-forming element. We fix the origin of time t=0 at the instant when the mass-forming element stops its relative movement ($\dot{\alpha}=0$) and is locked at the dead point (forward or back) of its travel. We then release the mass-forming element when $t=t_0$. The mass-forming element therefore begins again to rotate in relation to the float element until moment $t_1$ at which the relative speed is again zero ($\dot{\alpha}=0$) when the mass-forming element reaches the opposite dead point. $t_1$ therefore represents the half-period of the movement of the mass-forming element. Period $2t_1$ of the mass-forming element should be equal to or a multiple of the period of the incident swell so that the overall regime is periodic and established. We therefore have:

$$t_1 = \left(k + \frac{1}{2}\right)\frac{2\pi}{\omega} \quad [14]$$

where k=0, 1, 2, . . . .
Say that:
Δ=$t_1$−$t_0$
$X_0$=$X(t_0)$
$X_1$=$X(t_1)$
At t=$t_0$, [12] and [13] tell us that:

$$X_0 = \exp(A't_0) \cdot X_i + \Re((I \cdot e^{i\omega t_0} - \exp(A't_0)) \cdot (i\omega I - A')^{-1} \cdot B' \cdot e^{i\phi_0}) \quad [15]$$

and at t=$t_1$, we must have $X_1$=−X(0) because of the periodicity. We then get:

$$X(0) = -(I + \exp(A\Delta) \cdot \exp(A't_0))^{-1} \times \quad [16]$$
$$\Re\left[\begin{pmatrix} \exp(A\Delta) \cdot (I - \exp(A't_0)) \cdot e^{-i\omega t_0} \cdot \\ (i\omega I - A')^{-1} \cdot B' + \\ (I \cdot e^{i\omega\Delta} - \exp(A\Delta)) \cdot (i\omega I - A)^{-1} \cdot B \end{pmatrix} \cdot e^{i(\omega t_0 + \varphi_0)}\right]$$

Since here, $\dot{\alpha}$ is the eighth component of X (see equation [10]) and at t=0, by definition, speed $\dot{\alpha}$ is zero (instant of locking), cancellation of the eighth line of the equation [16] supplied the equation that is used to determine the optimum $t_0$ and therefore the optimal period $\hat{\delta}$ sought ($\hat{\delta}=t_0$).

The search algorithm of $\hat{\delta}$ for a given value of ω then executes in accordance with the following stages:

In a first stage, we establish all the terms of equation [16] From the given parameters (shape of the float element, masses, inertias, position of the mass-forming element, etc).

In a second stage, we set k=0, 1, 2, . . . .

In a third stage, we set $\phi_0 \in [0, \pi]$, the phase of the driving force $F_{ex}$.

In a fourth stage, we then look for the value of $t_0$ to satisfy equation [16].

In a fifth stage, we calculate the retrieved power over one cycle of operation for this torque solution ($\phi_0, t_0$).

In a sixth stage, we repeat the third, fourth and fifth stages for to scan the interval $\phi_0 \in [0, \pi]$ for the phase of the driving force $F_{ex}$.

In a seventh stage, we repeat the second, third, fourth and fifth stages, incrementing k (possibly, if ω>$ω_1$ the resonant pitch frequency of the float element).

In an eighth stage, we determine the torque ($\hat{\phi}_0(\omega), \hat{t}_0(\omega)$) that maximises the energy produced over a cycle, and for the corresponding value of ω, we store $\hat{\delta}(\omega) = \hat{t}_0(\omega)$ in a table of locking times.

The numerical simulations show that the system, driven by a regular swell ω and equipped with the lock/release control means with the value $\hat{\delta}$ thus determined, advances on its own toward an established regime with the phase $\hat{\phi}_0$, irrespective of the initial condition $\phi_0$ at the instant of release.

Control Algorithm by Latching

We are now going to describe the different stages of the method for controlling the locking means in the wave-energy conversion appliance.

As illustrated in FIG. 19, the control means include processing means designed to execute stages for determination of the locked period of the locking means.

In a first stage 100, measuring means regularly transmit to the processing means data that include parameter values relating to the six elementary movements of the float element as well as the relative angle α of the mass-forming element.

In a second stage 200, where necessary, the processing means filter the data in order to eliminate the parasitics and noise that they contain.

In a third stage 300, the processing means determine additional parameter values that include the time derivatives of the six parameters of movement, the components of the hydrodynamic radiation forces due to the movements of the float in the water, the components of the hydrodynamic drive forces due to the waves. These additional parameter values are determined from the parameter values relating to the six elementary movements of the float element through the use of a dynamic model of the wave-energy conversion appliance.

In a fourth stage 400, the processing means determine a present state of the appliance that includes assembly of the parameters determined at stages 100 and 30U, as well as past states of the appliance.

In a fifth stage 500 the processing means determine values of the driving force of the waves at a later time. In other words, the processing means predict values for the driving force of the waves at future moments, so as to detect the frequency of the next wave that will affect the appliance.

Such a prediction can be effected by using, for example, an algorithm of the "Extended Kalman filtering" type. For example, such an algorithm is described in the following publication:

"Self adaptative control of a piston wave-absorber", G. CHATRY. A. H. CLEMENT. T. GOURAUD, proceedings of the 8th international Offshore and Polar Engineering Conference, ISOPE 1998, Montreal, Vol 1, pp. 127-133.

Such an estimate is calculated continuously, independently of whether the mass-forming element is locked or not.

In a sixth stage 600, the control means control the locking means so that they lock the mass-forming element at the instant when the mass-forming element reaches a zero relative speed in relation to the float element, meaning when $\dot{\alpha}=0$. Simultaneously, the control means trigger a timing counter which measures the period of immobilisation of the mass-forming element in relation to the float element.

In a seventh stage 100, the processing means record the value of the driving frequency of the waves determined at stage 500.

In an eighth stage 800, the processing means determine the optimum locking period $\hat{\theta}$ of the mass-forming element. To this end, the processing means look up a pre-established table containing locking time values $\hat{\theta}$ as a function of the value of the driving frequency of the coining waves recorded at stage 700.

The table contains pre-established values of $\hat{\theta}$ with which values of the driving frequency of the waves are associated. These values of $\hat{\theta}$ have been determined for a regular swell and for the appliance concerned.

In a ninth stage 900, the control means command the locking means to release the mass-forming element when the timing counter has reached the optimum period $\hat{\theta}$.

Stages 100 to 800 are then repeated, so as to selectively lock or release the mass-forming element in order to amplify the movement of the mass-forming element by continuously adapting the dynamic of the appliance to the successive waves.

In the diagram at FIG. 6, curve A represents the amplitude $\alpha$ of the oscillations of the mass-forming element over time, when the mass-forming element is left free, for a given frequency of the waves in a regular swell.

The curve B represents the amplitude of the angular oscillations of the mass-forming element over time, when the locking means are activated by the control means.

The locking of the element for a predetermined period has the effect of modifying the overall dynamic of the appliance, continuously adapting it to the form of the excitation generated by the movement of the waves. Control of the locking means moves the resonant frequency of the appliance in an apparent manner, which has the effect of amplifying the movement of the mobile mass and thus the energy absorbed by the recovery device. On curve B, it is possible to distinguish the flat parts corresponding to the locked periods of the mass-forming element.

The diagram a) of FIG. 7 represents the amplitude of the oscillations of the float element (pitch) and the amplitude of the oscillations of the mass-forming element in relation to the float element, over time, when the mass-forming element is left free in irregular swell conditions.

Diagram b) of FIG. 7 represents the amplitude of the oscillations of the float element (pitch) and the amplitude of the oscillations of the mass-forming element in relation to the float element, over time, when the locking means are activated by the control means in the same swell conditions as in diagram b).

It can be seen that control by latching enables us to considerably increase the amplitude of the oscillations of the mass-forming element in relation to the float element.

The diagram of FIG. 8 shows the amplitude of the relative movement of the mass-forming element in relation to the float element, in a regular swell, as a function of the frequency of the swell, when the mass-forming element is left free (curve A) or when it is controlled by the locking means (curve B) This coefficient is the ratio between the angular response $\alpha$ and the maximum slope of the swell. This comes from the linearity of the response in relation to the drive action.

It can be seen that the appliance has two resonant frequencies $\omega_1$ and $\omega_2$ corresponding to the two peaks of curve A. Frequency $\omega_1$ corresponds to an oscillating mode in which the mass-forming element oscillates at a frequency $\omega_1$ equal to the frequency of the swell (k=0). Frequency $\omega_2$ corresponds to an oscillating mode in which the mass-forming element oscillates at a frequency equal to one third of the frequency of the swell (k=1), or a triple period.

The diagram of FIG. 9 shows the power generates by the oscillations of the mass-forming element in a regular swell as a function of the frequency of the swell when the mass-forming element is left free (curve A) or when it is controlled by the locking means (curve B). This power is expressed per metre when we divide it by the power of the incident swell per metre of wave front. We then speak of capture width.

It can be seen that when the frequency of the waves is exactly equal to the resonant frequency of the mass ($\omega=\omega_1$, then control of the locking means is not necessary since the response of the appliance is naturally optimum at this frequency. On the other hand, activation of the locking means is particularly advantageous when the frequency of the waves is different from the resonant frequency of the appliance. Control by latching is used to considerably broaden the pass band of the appliance. This characteristic has a beneficial effect not only for a regular sinusoidal driving force, but also in a real sea which is considered to be equivalent to the superimposition of many regular waves.

FIGS. 10 to 12 schematically represent the form of the float element 1 intended to be used in the embodiment of FIGS. 3, 4, 5A and 5B.

As can be seen in these figures, the float element 1 includes a top part 60 forming a hull surmounting a bottom part 70 forming an aileron, for the top and bottom parts (60, 70). The function of the top part 60 is to keep the appliance at the surface of the water, and that of the bottom part 70 is to contain the mass-forming element and to stabilise the appliance.

The bottom part 70 containing the mass-forming element has a flat, generally cylindrical that has two flat circular faces.

The float element 1 is profiled so as to turn naturally in the direction of propagation of the waves. In particular, the top part 60 has a generally elongated shape on a longitudinal axis X, with this longitudinal X axis lying parallel to the flat faces of the bottom part 70. In addition, the float element is symmetrical in relation to the plane containing the longitudinal X axis and the vertical Z axis of the appliance.

The top part 60 is of flared shape, which broadens toward the top below the waterline, and has a profiled shape without a superstructure above the waterline so as to minimise the damaging action of the breaking waves in extreme sea conditions.

More precisely, the top part 60 has the general form of a pyramid with a rhombic base. The top part 1 is located in such a manner that the summit of the pyramid is directed downwards when the float element is immersed. The large diagonal of the base of the pyramid lies along the longitudinal X axis and the small diagonal of the base of the pyramid lies on the transverse Y axis.

As illustrated in FIG. 12, when the appliance is immersed, it naturally positions itself in the water with the top part 60 above the bottom part 70. Also, when it is moored by a single line, the appliance is orientated naturally so that its longitudinal X axis corresponds more or loss to the main propagation direction of the waves. This characteristic means that the rotation axis of the mass-forming element (which is parallel to the transverse Y direction) is orientated perpendicularly to the direction of propagation of the waves so as to obtain maximum drive for the mass-forming element.

FIG. 13 schematically represents the internal mechanism of a wave-energy conversion device according to a fourth possible embodiment of the invention.

In this fourth embodiment, the mass-forming element is connected to the float element by a swivel link. The mass-forming element is therefore able to move with two degrees of freedom in rotation in relation to the float element.

FIG. 14 schematically represents the power recovery device in the appliance of FIG. 13. The power recovery device includes six actuators positioned on either side of the swivel link and orientates at 60 degrees to each other. Each actuator is located between the rod supporting the mass-forming element and the float element.

FIG. 15 schematically represents the internal mechanism of a wave-energy conversion device according to a fifth possible embodiment of the invention.

In this fifth embodiment, the mass-forming element is connected to the float element by a link of the universal-joint type. The universal-joint type link includes a universal joint component that is mounted to rotate on axis AA' in relation to the float element. The rod supporting the mass forming element is mounted to rotate on axis BB' in relation to the universal joint component, with axis BB' being perpendicular axis AA'. The mass-forming element is therefore able to move with two degrees of freedom in rotation in relation to the float element, about axes AA' and BB'.

FIG. 16 schematically represents a first power recovery device in the appliance of FIG. 15. This first power recovery device is intended to absorb the energy associated with the rotation of the mass-forming element about axis BB', where this rotation is driven by the rolling motion of the appliance. It includes actuators located between the rod supporting the mass forming element and the universal joint component.

FIG. 17 schematically represents a second power recovery device in the appliance of FIG. 15. This second power recovery device is intended to absorb the energy associated with the rotation of the mass-forming element about axis AA', this rotation being driven by the pitching movement of the appliance. It includes actuators located between the universal joint component and the float element.

FIG. 18 schematically represents locking means in the appliance of FIG. 15. The locking means include disk brakes positioned firstly on rotation axis BB' which are used to lock the rotation movement between the mass-forming element and the universal joint component, and secondly on rotation axis AA' which are used to lock the rotation movement between the universal joint component and the float element.

The locking means positioned respectively on axis BB' and on axis AA' can be operated individually by the control means as a function of the forces of the waves on these two axes.

The invention claimed is:

1. An appliance for the conversion of wave energy into electrical energy, including a closed float element (1) and a bob element (2), with the bob element (2) being placed inside the float element (1) and mounted to be mobile in relation to the float element (1), with the bob element (2) being designed to be driven into relative movement in relation to the float element (1) under the action of the waves on the float element (1), comprising:
locking means (13, 50-59) designed to lock the movement of the bob element (2), and control means designed to control the locking means (13, 50-59) so as to selectively lock or release the bob element (2) in order to amplify the movement of the bob element (2) by continuously adapting the dynamic of the appliance to the successive waves,
wherein the bob element is an oscillating weight having a natural frequency of oscillation.

2. An appliance according to claim 1, in which the control means are designed to control the locking means (13, 50-59) so that they lock the bob element (2) when the latter reaches a relative speed that is relatively zero in relation to the float element (1).

3. An appliance according to claim 1 or claim 2, in which the control means are designed to control the locking means (13, 50-59) so that they lock the bob element (2) for a locked period that is calculated as a function of the movement of the float element (1).

4. An appliance according to claim 1, in which the bob element (2) is free to rotate about a rotation axis, with the movement of the bob element (2) not being limited by a limiting device.

5. An appliance according to claim 1, in which the bob element (2) has a form of revolution with an axis of revolution (4), and the bob element (2) is able to rotate upon in relation to the float element (1) about this axis of revolution.

6. An appliance according to claim 5, in which the bob element (2) has a generally cylindrical shape and is able to rotate upon itself in relation to the float element (1) about the axis of the cylinder.

7. An appliance according to claim 4, in which the bob element has a center of gravity that is eccentric in relation to the axis of revolution.

8. An appliance according to claim 4, including a power recovery device that has at least one rotating wheel in contact with the bob element (2).

9. An appliance according to claim 8, in which the power recovery device includes a generator connected to the rotating wheel.

10. An appliance according to claim 4, including a power recovery device that includes a multiplicity of windings (81) and a multiplicity of magnets (82) positioned on the bob element (2) and on the float element (1) wherein when the bob element (2) is driven in rotation in relation to the float element (1), an electric current is generated in the windings (81),
wherein the windings (81) are positioned on the float element and the magnets (82) are positioned on the bob element.

11. An appliance according to claim 1, in which the float element includes a top part (60) surmounting a bottom part (70), with the bottom part (70) containing the bob element.

12. An appliance according to claim 11, in which the bottom part (70) has a generally flat cylindrical shape.

13. An appliance according to claim 11, in which the top part (60) is of flared shape, which broadens toward the top.

14. An appliance according to claim 13, in which the top part (60) is of flared shape, which broadens toward the top below the waterline, and a profiled shape without a superstructure above the waterline so as to minimise the damaging action of the breaking waves in extreme sea conditions.

15. An appliance according to claim 1, in which the float element (1) has a profile wherein when the appliance is immersed in water and moored by a single line, it is naturally orientated in relation to the main propagation direction of the waves so as to obtain maximum driving of the bob element (2),
wherein windings (81) are positioned on the float element and magnets (82) are positioned on the bob element.

16. An appliance according to claim 15, wherein the bob element (2) is mounted to rotate upon a rotation axis (A) in relation to the float element (1), with the appliance being orientated naturally so that the rotation axis (A) is substantially perpendicular to the main propagation direction of the waves.

17. An appliance according to claim 1, including a plurality of bob elements, mounted to be mobile in relation to the float element, with each bob element being designed to be driven into movement in relation to the float element under the action of the waves on the float element, and locking means associated with each bob element, with the control means being designed to control the locking means so as to selectively lock or release each of the bob elements.

18. A method for the conversion of wave energy into electrical energy from an appliance that includes a closed float element (1) and a bob element (2), with the bob element (2) being placed inside the float element (1) and mounted to be mobile in relation to the float element (1), with the bob element (2) being designed to be driven into movement in relation to the float element (1) under the action of the waves on the float element (1), comprising:

controlling a lock (13, 50-59) which locks the movement of the bob element (2) by selectively locking or releasing the bob element (2) in order to amplify the movement of the bob element (2) by continuously adapting the dynamic of the appliance to the successive waves.

19. A method according to claim 18, including stages in which:

measuring means regularly transmit, to processing means, data that include parameter values relating to the movements of the float element and of the bob element, the processing means determine the values of the dominant driving frequency of the waves at a later time, as a function of the measured parameter values, the control means control the locking means so that they lock the bob element at the instant when the mass-forming element reaches zero relative speed in relation to the float element, the processing means determine an optimum period ($\hat{\theta}$) for locking of the bob element, as a function of the values of the dominant drive frequency of the waves, the control means command the locking means to release the bob element when the timing counter has reached the optimum period ($\hat{\theta}$).

20. A method according to claim 19, in which, in order to determine the optimum period ($\hat{\theta}$) for locking the bob element, the processing means look up a pre-established table containing locking period values ($\hat{\theta}$) as a function of the value of the driving frequency of the waves at a later time.

21. A method according to claim 20, in which the locking-period values ($\hat{\theta}$) have been determined for a regular swell and for the appliance concerned.

\* \* \* \* \*